US012651170B2

(12) United States Patent
Tang et al.

(10) Patent No.: US 12,651,170 B2
(45) Date of Patent: Jun. 9, 2026

(54) ANOMALY DETECTION IN CYBER-PHYSICAL SYSTEMS

(71) Applicants: NEC Laboratories America, Inc., Princeton, NJ (US); NEC Corporation, Tokyo (JP)

(72) Inventors: Luan Tang, Pennington, NJ (US); Wei Cheng, Princeton Junction, NJ (US); Haifeng Chen, West Windsor, NJ (US); Yuji Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 1316 days.

(21) Appl. No.: 17/465,054

(22) Filed: Sep. 2, 2021

(65) Prior Publication Data

US 2022/0067535 A1     Mar. 3, 2022

Related U.S. Application Data

(60) Provisional application No. 63/074,046, filed on Sep. 3, 2020.

(51) Int. Cl.
| | |
|---|---|
| *G06N 3/088* | (2023.01) |
| *G06N 3/044* | (2023.01) |
| *G06N 3/045* | (2023.01) |

(52) U.S. Cl.
CPC ............. *G06N 3/088* (2013.01); *G06N 3/044* (2023.01); *G06N 3/045* (2023.01)

(58) Field of Classification Search
CPC ........ G06N 3/044; G06N 3/045; G06N 3/084;

G06N 3/088; G06N 3/0442; G06N 3/0455; G06N 3/0495; G06N 3/082; G06N 3/0895; G06N 3/09

See application file for complete search history.

(56) References Cited

U.S. PATENT DOCUMENTS

| | | | |
|---|---|---|---|
| 2019/0135300 A1* | 5/2019 | Gonzalez Aguirre | . G06N 20/00 |
| 2021/0166701 A1* | 6/2021 | Lim ...................... | G10L 19/002 |

OTHER PUBLICATIONS

Kirsch et al., "Modular Networks: Learning to Decompose Neural Computation", Nov. 13, 2018, arXiv:1811.05249v1, pp. 1-13. (Year: 2018).*
Cheng et al., "Meta multi-task learning for sequence modeling", Proceedings of the AAAI Conference on Artificial Intelligence. vol. 32, No. 1. Apr. 27, 2018, pp. 5070-5077.
Kirsch et al., "Modular networks: Learning to decompose neural computation", 32nd Conference on Neural Information Processing System. vol. 31. Dec. 2018, pp. 2408-2418.

* cited by examiner

*Primary Examiner* — Brent Johnston Hoover
(74) *Attorney, Agent, or Firm* — Vincent Duffy

(57)     ABSTRACT

Methods and systems for training and deploying a neural network mode include training a modular encoder model using training data collected from heterogeneous system types. The modular encoder model includes layers of neural network blocks and a selectively enabled connections between neural network blocks of adjacent layers. Each neural network block includes neural network layers. The modular encoder model is deployed to a system corresponding to one of the heterogeneous system types.

11 Claims, 6 Drawing Sheets

ANOMALY DETECTION IN CYBER-PHYSICAL SYSTEMS

RELATED APPLICATION INFORMATION

This application claims priority to U.S. Patent Application No. 63/074,046, filed on Sep. 3, 2020, incorporated herein by reference in its entirety.

BACKGROUND

Technical Field

The present invention relates to anomaly detection in cyber-physical systems, and, more particularly, to the use sensor data from electronic control units on a vehicle to detect anomalies in the vehicle.

Description of the Related Art

Vehicles are complex systems and including a variety of different functional components, such as the engine, battery, transmission, etc. Faults can lead to substantial safety problems and repair costs.

SUMMARY

A method for training and deploying a neural network mode include training a modular encoder model using training data collected from heterogeneous system types. The modular encoder model includes layers of neural network blocks and a selectively enabled connections between neural network blocks of adjacent layers. Each neural network block includes neural network layers. The modular encoder model is deployed to a system corresponding to one of the heterogeneous system types.

A method for performing anomaly detection includes collecting local sensor data. The local sensor data is encoded using a modular encoder model to generate an encoded representation. The modular encoder model includes layers of neural network blocks and selectively enabled connections between neural network blocks of adjacent layers. The selectively enabled connections are controlled by a local system-specific policy model. The encoded representation is decoded to generate reconstructed sensor data. An anomaly score is generated based on a comparison between the local sensor data and the reconstructed sensor data. A corrective action is performed responsive to the anomaly score.

A system for performing anomaly detection includes a hardware processor and a memory that stores a computer program. When executed by the hardware processor, the computer program causes the hardware processor to collect local sensor data, encode the local sensor data using to a modular encoder model to generate an encoded representation, decode the encoded representation to generate reconstructed sensor data, generate an anomaly score based on a comparison between the local sensor data and the reconstructed sensor data, and perform a corrective action responsive to the anomaly score. The modular encoder model includes layers of neural network blocks and selectively enabled connections between neural network blocks of adjacent layers. The selectively enabled connections is controlled by a local system-specific policy model.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Modern vehicles are equipped with a variety of electronic control units (ECUs), each of which may control a small operational unit of the vehicle, and may report the state of the operational unit. Faults in the vehicle's systems may be predicted and prevented based on data from the ECUs, which can prevent damage to the vehicle and loss of life. Using time series information generated by the ECUs, faults in the vehicle may be predicted for a given time period, with the fault being labeled as to a likely vehicle sub-system that is responsible.

This may be performed using a trained neural network model, using a first set of training data, $S_n$, which represents time series information from ECUs under normal operating conditions, and $S_f$, which represents time series information from the ECUs under a fault operating condition. The trained neural network model may be used to provide labels for new time series information $S_i$ from the ECUs of a car i, during a time period from $t_i$ to $(t_i+\sigma_t)$, where $\sigma_t$ is the duration of the prediction window. The trained neural network model may further be used to provide a fault label that may identify a sub-system in the vehicle where the fault is likely to occur.

Time series information may be streamed from the ECUs in real time, providing current information on the state of the vehicle and its sub-systems. The model that processes this information may be implemented in the vehicle itself, making low-latency determinations. The model may be trained remotely, for example in a cloud-based system that gathers ECU time series information from many different vehicles, and may then be distributed to the vehicles for use.

Training a model effectively may need a large amount of training data. However, it can be difficult to gather this training data in advance of deployment of the model. Rather than waiting for each individual system to gather sufficient training data to train its model, data may be gathered from multiple such systems. The collected training data may then be used to train a modular model, which may be distributed to the various systems, and which may be adapted by the local systems using a local policy model that takes into account local training information.

Figure 1:
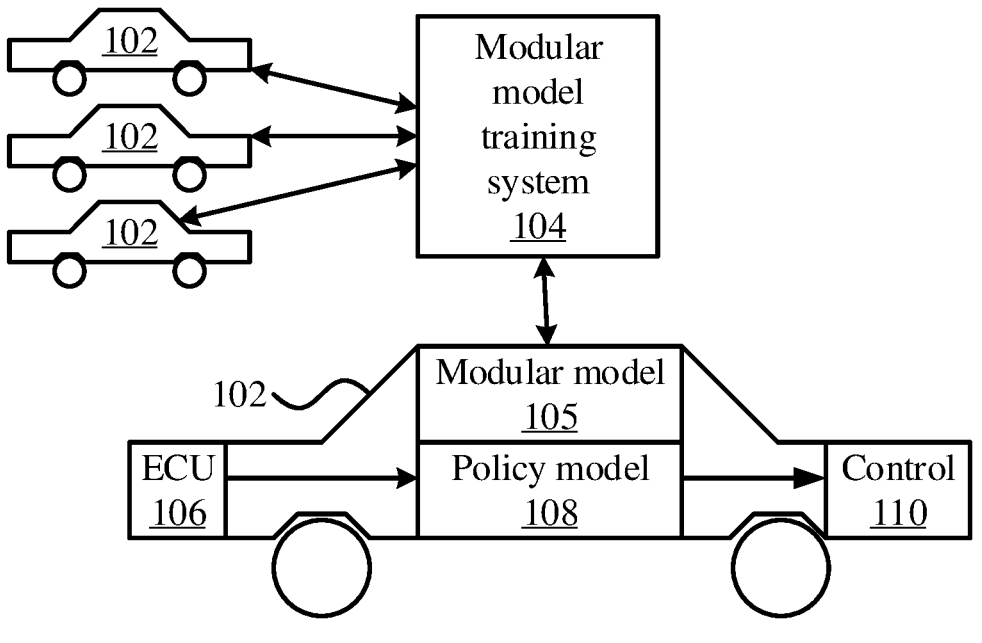
FIG. 1 is a diagram of a model training system that uses training data from a number of vehicles to generate a modular anomaly detection model that is transmitted to various vehicles, in accordance with an embodiment of the present invention.

Referring now to FIG. 1, an example of an anomaly detection model training system 104 is shown. The modular model training system 104 collects information from multiple vehicles 102. This information may be, for example, collected from ECUs 106 within the vehicles 102 and may represent time series information. Such time series information may include respective series of measurements or reports, made by an ECU over time. Thus, each ECU 106 may generate information that relates to a respective sub-system, which may be correlated with the information from other ECUs according to the time of measurement.

Training data may be labeled in a supervised or unsupervised manner. For example, a domain expert may manually label data according to whether that data reflects normal operation or a known fault state of a vehicle sub-system. In another example, data may be automatically labeled using unsupervised methods, such as an unsupervised clustering process. For example, in the case of vehicles, multiple vehicles of varying make and model may provide their respective sensor data, and this information may be used to train a modular model that can be distributed to all of the vehicles, regardless of their make and model.

After the modular model training system 104 has trained a modular anomaly detection model using the training data, the trained modular model may be distributed to the vehicles 102. Thus, the vehicles 102 may have their own local copy of the modular model 105. Each vehicle 102 furthermore has a policy model 108 that is trained on a per-vehicle basis. The policy model 108 assembles the modular model 105 and applies it to the specific conditions of the respective vehicle 102.

As new time series information is generated by the ECUs 106, the combination of the modular model 105 and the policy model 108 may make determinations as to whether the time series information predicts normal operation or an anomalous condition. A controller 110 may then take action based on the prediction, for example acting to prevent damage from a fault.

It should be understood that the vehicles that supply the training data may be different from the vehicles 102 that implement the trained modular model. In some cases, the vehicles 102 may all be of the same model, so that the trained modular model 105 may be specific to a particular model of vehicle. In some cases, the vehicles 102 may be of different models, so that the modular model 105 may be general and effective across multiple different vehicles models, with the policy model 108 providing control decisions for what parts of the modular model 105 are used. In some cases, the modular model 105 may be distributed to multiple different vehicle models, while the respective policy models 108 may handle model-specific factors. In some cases, the modular model 105 may be updated after its initial implementation, as additional training data is provided to the model training system 104. Thus, the modular model 105 may be installed at the vehicle 102 at the time of the vehicle's manufacture or sale, may be transmitted to the vehicle 102 using a wired or wireless network connection, or may be transferred to the vehicle 102 at any other appropriate time and by any other appropriate process.

Although the present principles are described with respect to the specific example of ECUs in an automobile, it should be understood that this example is not intended to be limiting. Anomaly detection, as described herein, may be performed in any appropriate cyber-physical system. Furthermore, although the present principles are described in the context of distributed anomaly detection, it should be understood that the modular model 105 may also be housed in a central location, with operational information being transmitted to the central location for anomaly detection.

Figure 2:
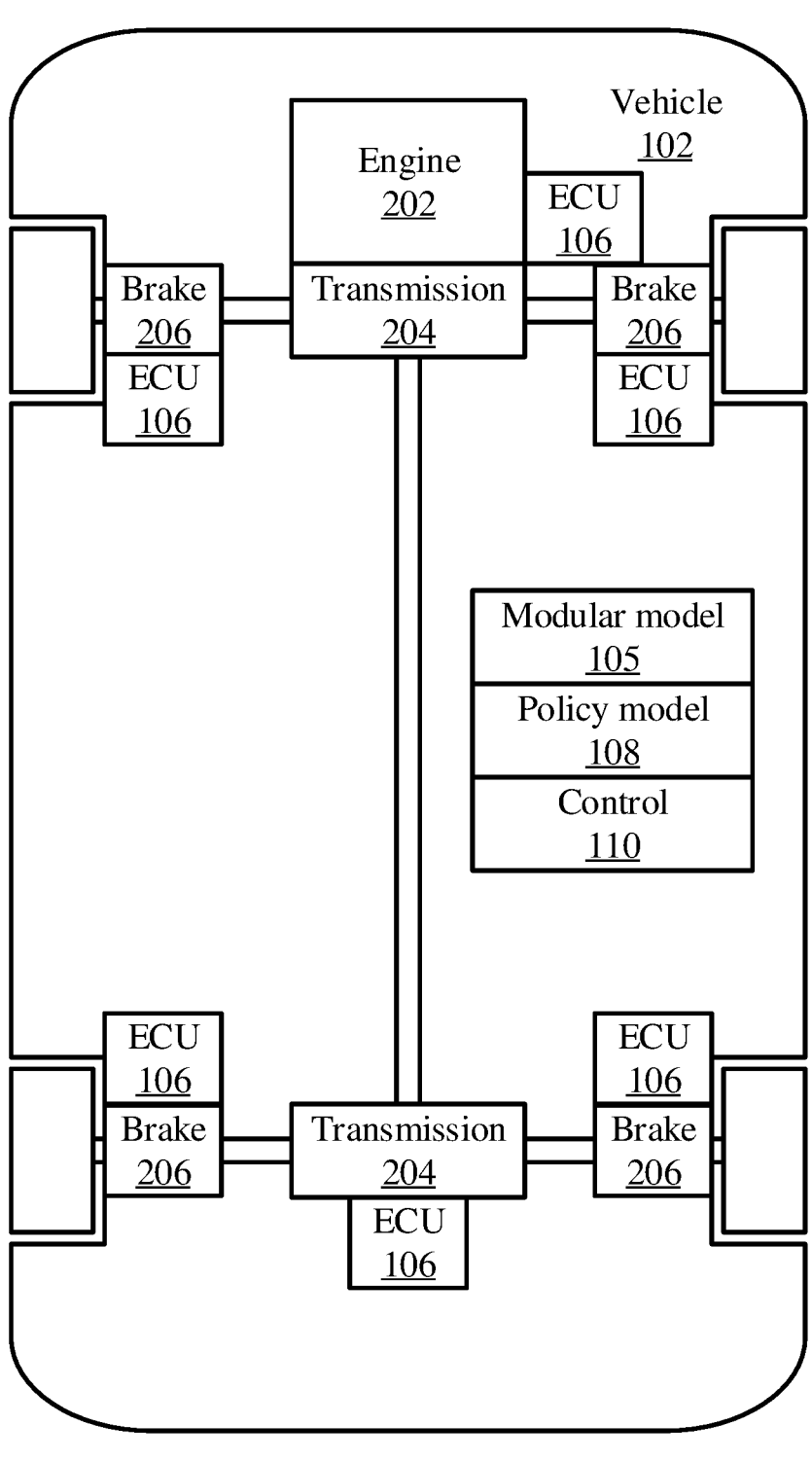
FIG. 2 is a diagram of a vehicle that uses a trained modular anomaly detection model to predict and correct anomalies in vehicle sub-systems, in accordance with an embodiment of the present invention.

Referring now to FIG. 2, additional detail on a vehicle 102 is shown. A number of different sub-systems of the vehicle 102 are shown, including an engine 202, a transmission 204, and brakes 206. It should be understood that these sub-systems are provided for the sake of illustration, and should not be interpreted as limiting. Additional sub-systems may include user-facing systems, such as climate control, user interface, steering control, and braking control. Additional sub-systems may include systems that the user does not directly interact with, such as tire pressure monitoring, location sensing, collision detection and avoidance, and self-driving.

Each sub-system is monitored by one or more ECUs 106, which perform measurements of the state of the respective sub-system. For example, ECUs 106 relating to the brakes 206 may determine an amount of pressure that is applied by the brakes 206, temperature of the brakes 206, and remaining usable lifetime of the brakes 206. The information that is gathered by the ECUs 106 is supplied to the controller 110.

Communications between ECUs 106 and the sub-systems of the vehicle 102 may be conveyed by any appropriate wired or wireless communications medium and protocol. For example, a car area network (CAN) may be used for communication. The time series information may be communicated from the ECUs 106 to the controller 110, and instructions from the controller 110 may be communicated to the respective sub-systems of the vehicle 102.

The controller 110 uses the modular model 105 and the policy model 108 to determine whether the time series information from the ECUs 106 is predictive of a fault. Toward that end, the policy model 108 may control which portions of the modular model 105 are used, turning off internal connections between neural network cells of the modular model 105 as needed. The modular model 105 may then be used as an encoder, transforming collected sensor information into a latent space, and the controller 110 may then decode the output of the modular model 105 using vehicle-specific information. The policy network 108 may further govern how information is passed from the modular model 105 to the controller 110, as described in greater detail below. The new time series information is input to the modular model 105 and the policy model 108, and the combined models output a label (e.g., "normal" or "fault") that may include an indication of a sub-system that is responsible for a fault condition. This output may further include a fault score and an anomaly score to represent the operating condition of the vehicle 102.

The controller 110 may communicate internally, to the sub-systems of the vehicle 102 and the ECUs 106, as well as externally, to the model training system 104. For example, the controller 110 may receive model updates from the model training system 104, and may furthermore provide collected time series information from the ECUs 106 back to the model training system 104. For example, in the event that the combined models indicate abnormal behavior that does not conform to a recognized fault, the controller 110 may send the corresponding time series information back to the model training system 104, where it may be used to train future iterations of the modular model 105 and the policy model 108.

Figure 3:
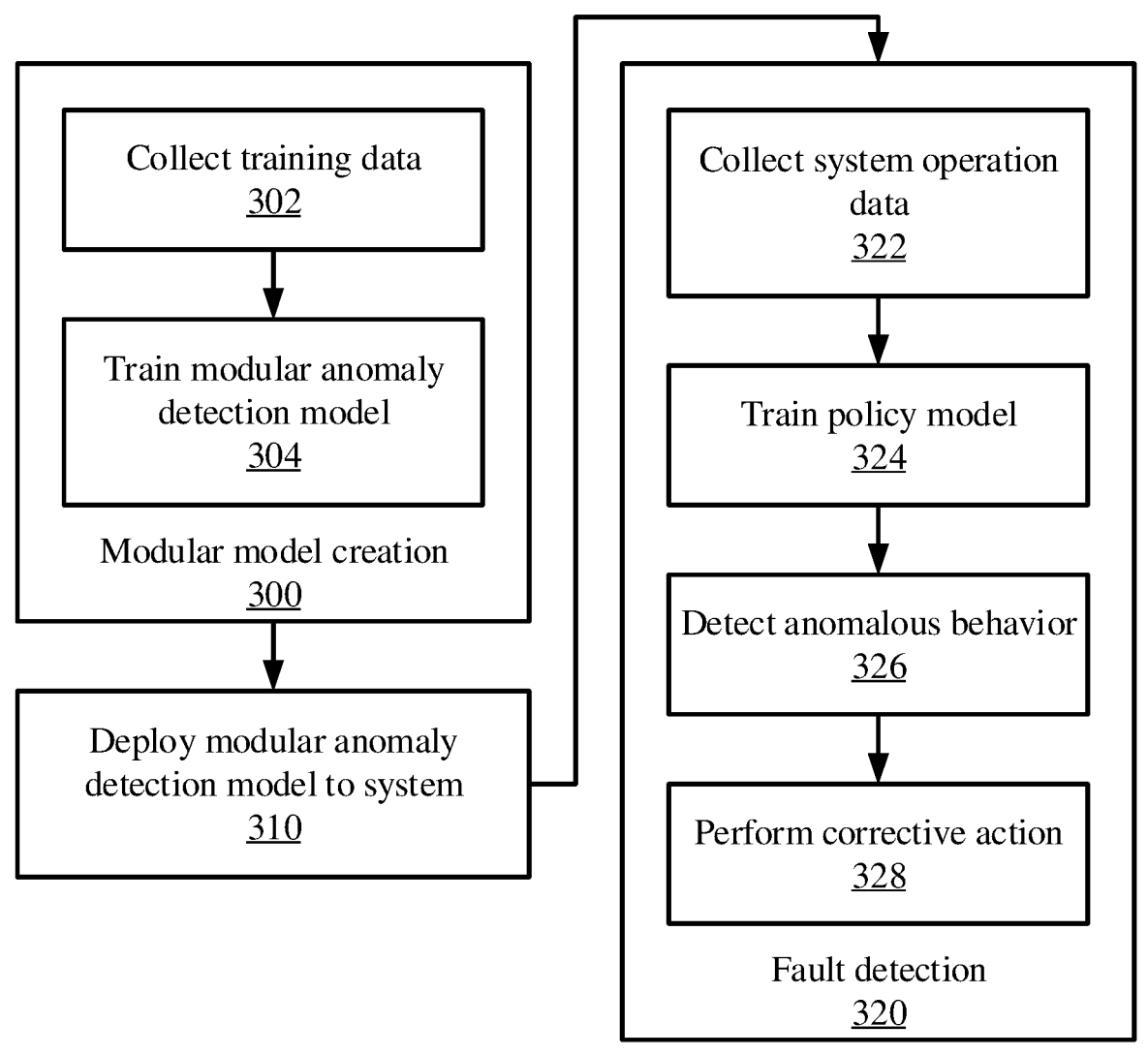
FIG. 3 is a block/flow diagram of a method for training and using a modular anomaly detection model, in accordance with an embodiment of the present invention.

Referring now to FIG. 3, a method for training and using an anomaly detection model is shown. Block 300 creates the anomaly detection model. Block 310 deploys the anomaly detection model to a system, such as a vehicle 102. Block 320 then uses the deployed anomaly detection model to detect an anomaly. Each of blocks 300, 310, and 320 may be performed by different entities, and each may be performed independently of the others.

Model creation 300 includes the collection of training data 302. This training data collection 302 may include receiving time series data from ECUs 106 of vehicles 102. The training data may be labeled by a domain expert or may be labeled in an unsupervised or semi-supervised manner. Thus, the training data may include time series information that is labeled as being "normal" or a "fault." The training data may be divided into segments, for example using a sliding time window to divide a time series into segments of a consistent time length. Model creation 300 then uses the training data to train a modular fault detection model in block 304, as will be described in greater detail below. The training of block 304 may include determining a graph that represents relationships between different ECUs 106.

Block 310 deploys the modular anomaly detection model to an appropriate system, such as a vehicle 102. This deployment can be performed using any appropriate wired or wireless communications medium and protocol. For example, deployment may be performed as part of an over-the-air update to a vehicle 102 using a mobile data network.

Block 320 performs anomaly detection at the deployed location. For example, block 322 may collect system operation data from the various sub-systems of a vehicle 102 using the ECUs 106. This system operational data, which is specific to the vehicle 102, may be used to train the policy model 105 and the decoder in the controller 110 in block 324.

Block 326 detects anomalous behavior, for example by using the collected system operation data as an input to the deployed modular anomaly detection model 105. The modular anomaly detection model 105 is controlled by a local policy model 108, which is trained using locally collected sensor data, and which determines the parts of the modular anomaly detection model 105 that will be used. For example, in addition to the particulars of the vehicle's configuration, the policy model 108 may capture the driver's driving habits. As will be described in greater detail below, this detection may generate two distinct scores: a fault score, which may represent a similarity between the system operation data and a known fault, and an anomaly score, which represents dissimilarity between the system operation data and any known operational data pattern.

Block 328 then performs a corrective action, responsive to the detection of a fault or anomalous behavior. This corrective action may include, for example, notifying an operator of a potential fault or anomaly or communicating with a service station to schedule maintenance. The corrective action may include, for example, an automatic action to correct or prevent the anomaly. Such automatic actions may include changing an operational status of one or more sub-systems, such as by changing the setting of one or more devices in the vehicle 102, stopping the engine 202, applying the brakes 206, applying a steering change, changing gears, and changing operational properties of the engine 202, transmission 204, or brakes 206 to compensate for an adverse condition.

When block 326 uses the modular anomaly detection model 105 and the policy model 108 to detect anomalous behavior, it may generate a separate fault score and anomaly score. If the anomaly score is low and the fault score is low, the system is operating normally. If fault score is high and the anomaly score is high, then a fault has been detected. If the anomaly score is high and the fault score is low, then the vehicle is in an unknown condition. Further monitoring may be needed, and additional information may be gathered and forwarded for analysis to better understand this new state. If the fault score is high, while the anomaly score is low, this indicates a problem with the model, and may trigger retraining. The state of the system can also be determined in terms of how the anomaly score and the fault score change over time. If the fault score is increasing, then a fault may be imminent, and the operator may be alerted.

Figure 4:
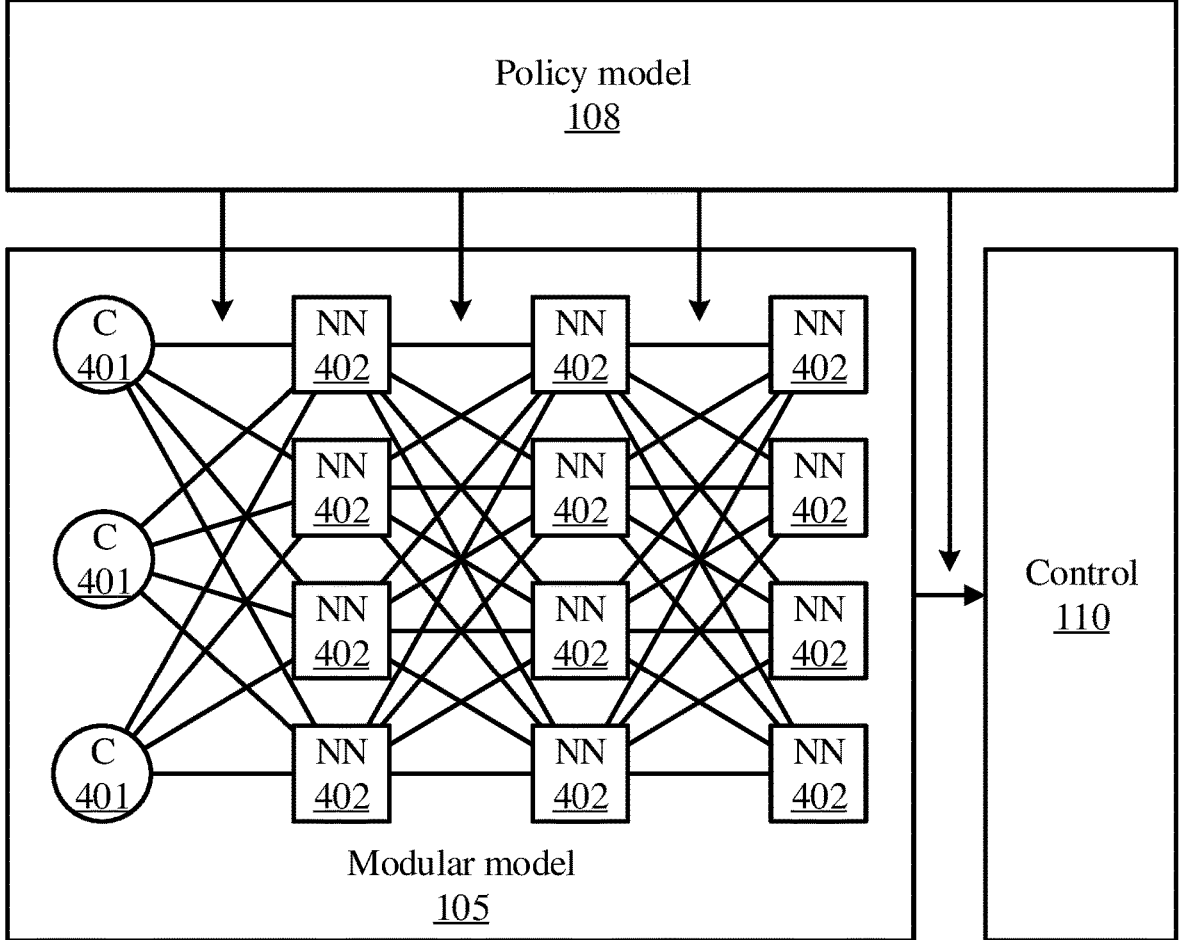
FIG. 4 is a block diagram illustrating a relationship between a modular anomaly detection model and a vehicle-specific policy model, in accordance with an embodiment of the present invention.

Referring now to FIG. 4, additional detail on the relationship between the modular model 105, the policy model 108, and the controller 110 is shown. The modular network 105 acts as an encoder, taking input data and transforming it into a space with reduced dimensions. The encoder may have a n layers, with each layer having a potentially different number of sub-networks, the number of which may be determined by a user. The first layer of the modular model 105 may include independent long short-term memory (LSTM) cells 401. Other layers may include general neural network blocks 402, which may be fully connected to the neural network blocks 402 of neighboring layers. Each neural network block may be a sub-network and may represent a specific feature or function of components of a vehicle.

The modular model 105 may be a relatively large model, with many more parameters than the policy model 108 and the vehicle-specific decoder implemented by the controller 110. The modular model 105 may be trained by data from many different types of cars, which may vary by make, model, year, and trim. The trained modular model 105 may thus be shared between may different heterogeneous types of vehicle.

When deployed to a vehicle 102, some of the neural network blocks 404 may be deactivated, in accordance with the needs of the vehicle. This is performed by the car-specific policy network 108, which determines which neural network blocks 404 will be selected. The policy network 108 may generate a decision vector that determines whether particular edges between a given neural network block 402 and other neural network blocks 402 are enabled. The decision vector thus may include a set of binary values, corresponding to respective connections between neural network blocks 402. For example, a value of zero may indicate that the corresponding connection is not used, and that the corresponding neural network blocks do not communicate during operation. The policy network 108 may similarly make such determinations for the connections between the final layer of the modular model 105 and the decoder of the controller 110. The policy model 108 and the car-specific decoder of the controller 110 may be trained jointly with the modular network 105. The policy network may thus output binary values, representing a decision to connect or disconnect a given connection. In some cases, the car-specific decoder of the controller 110 may be implemented as a mirror of the modular model 105, including modifications made by the policy model 108.

The controller 110 includes a car-specific decoder to generate the final output, such as the anomaly scores and fault scores. The decoder may include n independent neural network blocks, being the same as n, the number of layers in the modular model 105. Each neural network block of the decoder provides layer-specific sub-decoders to extract vehicle-related information from different layers of the modular model 105. The sub-decoder may receive a list of tuples of features from a respective layer of the modular model 105. To consider the hierarchical structure of encoder information, the output of each sub-decoder may be concatenated to construct output vectors for the resulting scores.

To train the anomaly detection model 105, in the context of block 304, autoencoder training may be performed. Historical data of the various vehicles 102, collected at the modular model training system 104, is used as input. The modular model 105 learns the common knowledge of multiple types of cars as a set of assembled sub-networks. Each of the n layers of the modular model 105 may have q sub-networks. Each of the neural network blocks 402 may be a small neural network, with a pre-defined size that establishes a number of layers and a number of nodes per layer for the small neural network.

The collected input data may be encoded using the modular model 105 that is being trained at the modular model training system 104. This transforms the input data to a compressed feature output. A shared decoder may then be used to decode the compressed feature output and to generate reconstructed input data. The shared decoder may be a mirror image of the modular model 105, having the same neural network blocks and parameters. Discrepancies between the original input data and the reconstructed input data may be used to adjust the parameters of the neural network blocks 402 to minimize the reconstruction error.

This form of training may be understood as an autoencoder. Autoencoder networks may include two sections: an encoder section and a decoder section. The encoder section may create a relatively low-dimensional embedding of a relatively high-dimensional input, while the decoder section may recreate the original high-dimensional input. The autoencoder network is trained to recreate the original input as closely as possible. Such networks may be used in various ways. For example, the low-dimensional embedding may be used as a relatively compact representation of the original input. The high-dimensional output, meanwhile, may be used to reconstruct information from a noisy input.

To train the policy model 108 in block 324, collected system operation data from block 322 may be used as an input. Using the deployed shared model 105 in an autoencoder configuration, local vehicle operation data is used, with the reconstruction error being used to train the behavior of the policy model 108. The training process seeks to minimize the difference between the original local training data and the reconstructed local training data.

As noted above, the policy model 108 determines which neural network blocks 402 of the modular model 105 are to be connected to neighboring blocks. During training of the policy model 108, the parameters of the modular model 105 may be kept static, so that only parameters of the policy model 108 are changed to control the behavior of the modular model 105. The policy model 108 may be implemented as a classifier, which accepts information relating to the type of vehicle 102 that it is implemented in, and which outputs a binary decision vector. The policy network 102 may be trained to enable particular connections between neural network blocks in the modular model 105 to minimize errors.

During operation in block 326, the modular model 105 may again be used in an autoencoder structure, with the deployed modular model 105 acting as the encoder and a mirror of the deployed modular model 105 being used as the decoder. When new data from the vehicle 102 is supplied to this autoencoder, reconstructed new data is generated. The difference between the new data and the reconstructed new data may be used as an anomaly score, with greater degrees of divergence between the two signifying operational conditions that were not shown in the training data.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 5:
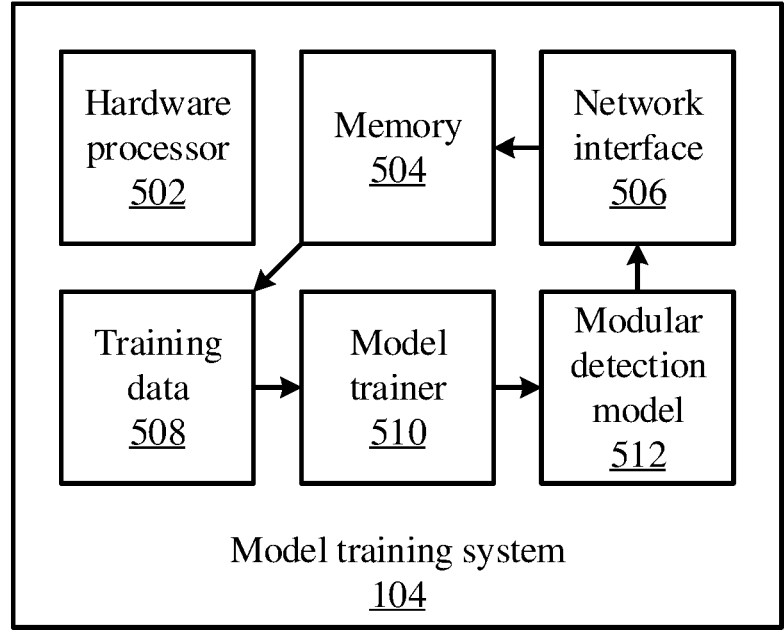
FIG. 5 is a block diagram of a modular anomaly detection model training system, in accordance with an embodiment of the present invention.

Referring now to FIG. 5, additional detail on the model training system 104 is shown. The system 104 includes a hardware processor 502 and a memory 504. A network interface 506 provides communications between the system 104 and one or more cyber-physical systems, such as vehicles 102. The network interface 506 may use any appropriate wired or wireless communications medium and protocol. The system 104 furthermore includes functional modules, which may be stored in the memory 504 as software and may executed by the hardware processor 502. One or more of the functional modules may be implemented as discrete hardware components, for example in the form of an ASIC or FPGA.

The memory 504 stores training data 508, which may be collected via the network interface 506 from multiple different types of vehicle 102. The training data 508 includes datasets of time series information measured from exemplary cyber-physical systems. For example, the ECUs 106 of a set of vehicles 102 may be tracked over time to generate respective training data 508. A model trainer 510 uses this information to train a modular anomaly detection model 512, such as the modular model 105 described above.

This trained modular anomaly detection model 512 may be transmitted to the different cyber-physical systems for implementation. For example, the network interface 506 may transmit the trained modular model 510 to a fleet of heterogeneous vehicles 102, for use during operation to identify and predict anomalies.

As noted above, the modular anomaly detection model 512 may include multiple neural network blocks 402, each of which may be implemented as an artificial neural network (ANN), which is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained using a set of training data, with learning that involves adjustments to weights that exist between the neurons. An ANN is configured for a specific application, such as pattern recognition or data classification, through such a learning process.

Figure 6:
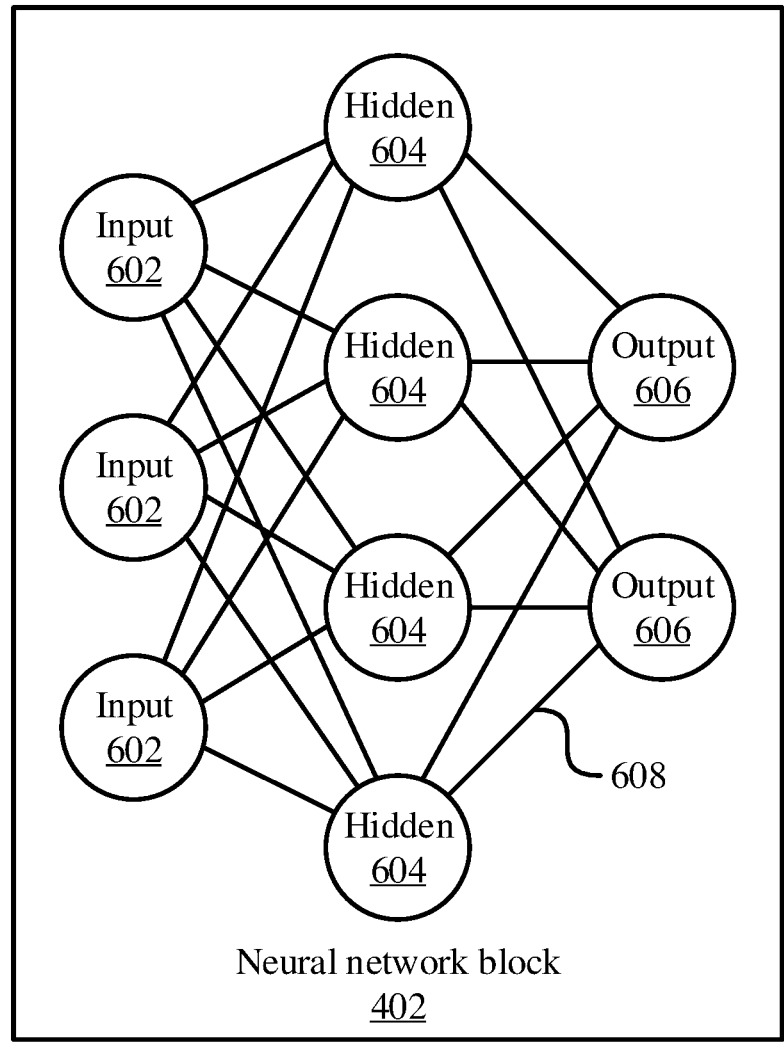
FIG. 6 is a block diagram of a neural network block in a modular anomaly detection model, in accordance with an embodiment of the present invention.

Referring now to FIG. 6, a generalized diagram of a neural network is shown. Although a specific structure of an ANN is shown, having three layers and a set number of fully connected neurons, it should be understood that this is intended solely for the purpose of illustration. In practice, the present embodiments may take any appropriate form, including any number of layers and any pattern or patterns of connections therebetween.

ANNs demonstrate an ability to derive meaning from complicated or imprecise data and can be used to extract patterns and detect trends that are too complex to be detected by humans or other computer-based systems. The structure of a neural network is known generally to have input neurons 602 that provide information to one or more "hidden" neurons 604. Connections 608 between the input neurons 602 and hidden neurons 604 are weighted, and these weighted inputs are then processed by the hidden neurons 604 according to some function in the hidden neurons 604. There can be any number of layers of hidden neurons 604, and as well as neurons that perform different functions. There exist different neural network structures as well, such as a convolutional neural network, a maxout network, etc., which may vary according to the structure and function of the hidden layers, as well as the pattern of weights between the layers. The individual layers may perform particular functions, and may include convolutional layers, pooling layers, fully connected layers, softmax layers, or any other appropriate type of neural network layer. Finally, a set of output neurons 606 accepts and processes weighted input from the last set of hidden neurons 604.

This represents a "feed-forward" computation, where information propagates from input neurons 602 to the output neurons 606. Upon completion of a feed-forward computation, the output is compared to a desired output available from training data. The error relative to the training data is then processed in "backpropagation" computation, where the hidden neurons 604 and input neurons 602 receive information regarding the error propagating backward from the output neurons 606. Once the backward error propagation has been completed, weight updates are performed, with the weighted connections 608 being updated to account for the received error. It should be noted that the three modes of operation, feed forward, back propagation, and weight update, do not overlap with one another. This represents just one variety of ANN computation, and that any appropriate form of computation may be used instead.

To train an ANN, training data can be divided into a training set and a testing set. The training data includes pairs of an input and a known output. During training, the inputs of the training set are fed into the ANN using feed-forward propagation. After each input, the output of the ANN is compared to the respective known output. Discrepancies between the output of the ANN and the known output that is associated with that particular input are used to generate an error value, which may be backpropagated through the ANN, after which the weight values of the ANN may be updated. This process continues until the pairs in the training set are exhausted.

After the training has been completed, the ANN may be tested against the testing set, to ensure that the training has not resulted in overfitting. If the ANN can generalize to new inputs, beyond those which it was already trained on, then it is ready for use. If the ANN does not accurately reproduce the known outputs of the testing set, then additional training data may be needed, or hyperparameters of the ANN may need to be adjusted.

ANNs may be implemented in software, hardware, or a combination of the two. For example, each weight 608 may be characterized as a weight value that is stored in a computer memory, and the activation function of each neuron may be implemented by a computer processor. The weight value may store any appropriate data value, such as a real number, a binary value, or a value selected from a fixed number of possibilities, that is multiplied against the relevant neuron outputs.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for performing anomaly detection, comprising:

collecting local sensor data;

encoding the local sensor data using a modular encoder model to generate an encoded representation, wherein the modular encoder model includes a plurality of layers of neural network blocks and selectively enabled connections between neural network blocks of adjacent layers, with the selectively enabled connections being controlled by a local system-specific policy model that includes a classifier that outputs a binary decision vector, with each value of the binary decision vector controlling a respective connection of the selectively enabled connections between the neural network blocks and selectively enabled connections between the deployed modular encoder model and a system-specific decoder that performs the decoding;

decoding the encoded representation to generate reconstructed sensor data;

generating an anomaly score based on a comparison between the local sensor data and the reconstructed sensor data; and performing a corrective action responsive to the anomaly score.

2. The method of claim 1, wherein the local sensor data is generated by sensors in a vehicle, each sensor being associated with a vehicle sub-system.

3. The method of claim 1, further comprising training the local system-specific policy model using historical local sensor data.

4. The method of claim 1, further comprising receiving the modular encoder model from a model training server.

5. The method of claim 1, wherein each neural network block includes a plurality of neural network layers.

6. The method of claim 1, wherein the corrective action is an automatic action selected from the group consisting of acceleration, braking, and steering in a vehicle.

7. A system for performing anomaly detection, comprising:

a hardware processor; and a memory that stores a computer program, which, when executed by the hardware processor, causes the hardware processor to:

collect local sensor data;

encode the local sensor data using to a modular encoder model to generate an encoded representation, wherein the modular encoder model includes a plurality of layers of neural network blocks and selectively enabled connections between neural network blocks of adjacent layers, with the selectively enabled connections being controlled by a local system-specific policy model that includes a classifier that outputs a binary decision vector, with each value of the binary decision vector controlling a respective connection of the selectively enabled connections between the neural network blocks and selectively enabled connections between the deployed modular encoder model and a system-specific decoder that performs the decoding;

decode the encoded representation to generate reconstructed sensor data;

generate an anomaly score based on a comparison between the local sensor data and the reconstructed sensor data; and perform a corrective action responsive to the anomaly score.

8. The system of claim 7, further comprising a sensor, associated with a vehicle sub-system, that generates the local data.

9. The system of claim 7, wherein the computer program further causes the hardware processor to train the local system-specific policy model using historical local sensor data.

10. The system of claim 7, further comprising a network interface configured to receive the modular encoder model from a model training server.

11. The system of claim 7, wherein the corrective action is an automatic action selected from the group consisting of acceleration, braking, and steering in a vehicle.

\* \* \* \* \*